Patented Feb. 20, 1934

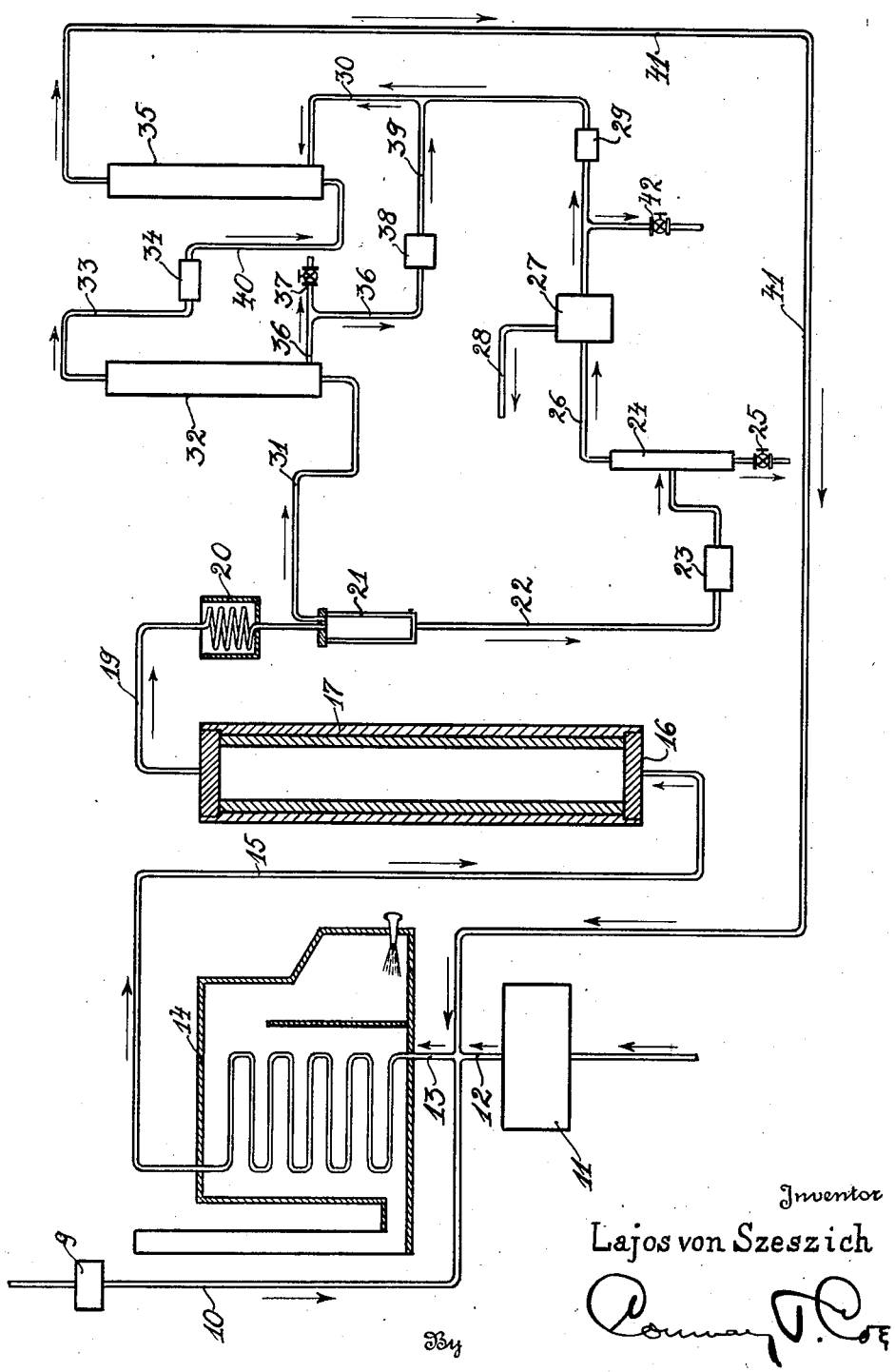

1,948,058

UNITED STATES PATENT OFFICE 1,948,058

DESTRUCTIVE HYDROGENATION OF CARBONACEOUS MATERIALS

Lajos von Szeszich, Constance, Germany

Application May 25, 1931, Serial No. 540,013, and in Germany October 30, 1930

5 Claims. (Cl. 196—53)

The present invention relates to the treatment by means of hydrogen or gases containing or yielding hydrogen, of carbonaceous materials, particularly materials containing sulphur, at high temperatures and high pressures in the presence of catalysts. The starting materials are converted into valuable products which are usually liquid, by hydrogenation, reduction or splitting, and in some cases by means of more than one of such actions.

In the prior patent application Serial No. 514,071 filed February 6th, 1931, a process is set forth and claimed for the treatment of carbonaceous materials especially such as contain sulphur, with hydrogen at raised temperatures and high pressures, in the presence of molybdenum or tungsten catalysts or both, the hydrogenating gases being maintained in circulation in such a way that such amounts of hydrogen sulphide are maintained in the circulating current of hydrogen that as a result the activity of the catalyst consisting of molybdenum or tungsten or both or their compounds, is increased.

According to the present invention, which is illustrated in the annexed drawing, the destructive hydrogenation process is carried out by dividing the vapours taken off from the process into a liquid and a gaseous portion while maintaining or approximately maintaining the working pressure, and the gaseous portion consisting mainly of hydrogen is led back into the reaction vessel together with such amounts of hydrogen sulphide that, in the vessel, a concentration of hydrogen sulphide is maintained owing to which the activity of the molybdenum or tungsten catalyst is increased. By this method of working according to the present invention, only relatively trifling differences in pressure have to be handled. Consequently it is possible to work with simple apparatus which enable, in some cases, moderate increases in pressure to be easily produced for the purpose of re-establishing the reaction pressure.

In the treatment of material containing sulphur which yield gases which contain hydrogen sulphide and in some cases in considerable amounts, so much hydrogen sulphide may be withdrawn from the gaseous portion consisting mainly of hydrogen, for example, by washing or like methods, that the amount of hydrogen sulphide in the hydrogen returning to the reaction vessel together with the amount of hydrogen sulphide evolved from the sulphur compounds in the material to be treated gives rise to such a concentration of hydrogen sulphide in the reaction vessel that the increase in activity of the catalyst striven for is produced to the greatest possible extent. For this purpose, for example, the circulating current of gas under pressure may be washed with such small amounts of water, oils, aqueous suspensions of iron hydroxide, lime or the like, for example, that the content of hydrogen sulphide, is reduced in the desired manner. Oils poor in sulphur which themselves are to be subjected to the hydrogenation may be employed with advantage for taking up of the hydrogen sulphide. As a result, said oils may be adjusted to the desired content of sulphur so that upon hydrogenation of the same in the presence of the molybdenum or tungsten catalyst, increases in activity of the latter may be produced.

For example, only a portion of the gases rich in hydrogen may be completely or to a large extent deprived of the hydrogen sulphide and by mixing the washed gas with the unwashed gas, the content in hydrogen sulphide of the gas returned to the reaction vessel may be adjusted to the desired amount.

Under some circumstances, the desired effect of the adjustment of the hydrogen sulphide to an optimum concentration in the circulating gas can be produced in a simpler fashion by allowing a definite amount of the gases containing hydrogen sulphide to escape through a valve and by replacing the amount of gases containing hydrogen sulphide thus blown off by a corresponding amount of hydrogen. The hydrogen or hydrogen sulphide in the gases removed may be utilized again. Both methods may also be combined viz: the escape of a part of the gases coming from the hydrogenation reaction and the withdrawal of desired amounts of hydrogen sulphide. Obviously in all these methods, any fresh hydrogen added is to be regarded as a substitute for the hydrogen consumed.

In cases in which the content of hydrogen sulphide in the gases containing hydrogen is not sufficient in order to maintain the concentration of hydrogen sulphide in the reaction vessel for increasing the activity of the molybdenum and tungsten catalysts, care must be taken to add an amount of hydrogen sulphide corresponding to the deficiency or such amounts of hydrogen sulphide, sulphur or other sulphur compounds yielding hydrogen sulphide must be added to the oils or the like to be hydrogenated, that the desired concentration of hydrogen sulphide in the reaction vessel is ensured.

The addition of hydrogen sulphide to the circulating current of gas is effected with advantage after the current of gas has passed through conveying devices such as pumps or the like, that is, immediately before the gas is conducted back to the hydrogenation vessel. The necessary hydrogen sulphide may, in this way, also be introduced with the fresh hydrogen. Under some circumstances, it is to be particularly recommended to remove the hydrogen sulphide before reaching the conveying device as completely as possible and to introduce it again into the cycle in suitable amounts after passing this device. This form of the process in addition to the already-mentioned advantages of adjusting the hydrogen sulphide to the optimum concentration also presents the further advantage that it renders the use of special material resisting the attack of the hydrogen sulphide or the sulphur compounds for the conveying devices unnecessary, since by leading around the corrosive gas constituents, no corrosion can take place here.

The above described method of working can also be employed in case the amount of hydrogen sulphide in the hydrogenating gas in the cycle is precisely the optimum amount necessary for carrying out the reaction. In this case also, a gas freed as completely as possible from hydrogen sulphide will not be led back to the reaction vessel as was the case in previous hydrogenation processes of this kind, but first, the hydrogen sulphide will be removed as completely as possible, then, however, it will be again supplied to the non-corrosive circulating gas passing through the conveying devices in such concentration as corresponds to the original optimum concentration.

The gaseous portions of the vapours from the hydrogenating reaction separated from the reaction products may, in some cases before the return of the hydrogen into the reaction vessel, be subjected wholly or partly to a washing process or, in some cases, to a number of washing processes while maintaining or approximately maintaining the pressure of the reaction. In this way, the gases may be partly or even completely freed from the hydrogen sulphide present in them.

In carrying out the invention, the mixture of gas or vapour coming off from the hydrogenation vessel may, for example, be conducted through suitable cooling apparatus and then, for example, led into a first washing tower. In this tower, water flows under pressure from above in counter-current to the mixture so that the washing tower operates also as an injection cooler. The mixture run off is separated into aqueous liquid and oily condensate. The aqueous layer, which contains some ammonium sulphide in solution and the main amount of the hydrogen sulphide and is still under the pressure existing in the reaction vessel, is for example conducted to a Montejus plant which forces the aqueous liquid with sufficient highly compressed hydrogen into a second washing tower. Here the circulating gas, practically completely freed from hydrogen sulphide, passes into a subsequent washer, where in some cases it is washed with alkaline liquids and then it is introduced by a circulating pump at the necessary working pressure preferably from below. In the second washing tower, the gas is charged with the necessary amount of hydrogen sulphide, for example, by being brought into intimate contact with the washing liquid from the first tower containing hydrogen sulphide. The process may be facilitated by heating. The mixture of hydrogenating gas and hydrogen sulphide is introduced from the second tower into the hydrogenation vessel without the interposition of any further apparatus.

The condensates obtained by condensation under pressure may serve as the source of the hydrogen sulphide to be added. In this way the hydrogen sulphide may be obtained by treatment with washing liquids and may be then driven off again, for example by heating.

However, the hydrogen sulphide to be added may also be obtained from the so-called methane fraction which is obtained upon releasing the pressure of the condensate. The methane gases may be washed with milk of lime and the hydrogen sulphide thus taken into combination can then be liberated again under pressure by means of acids. Advantageously, the hydrogen for the hydrogenation or the additional hydrogen is led at the pressure of the reaction through the washing liquid with which the methane gases are washed, preferably while heated and are charged with hydrogen sulphide in this way. Also the methane gases may be washed with the oil to be hydrogenated and thus hydrogen sulphide is introduced into the process in such amounts that, together with the amounts of hydrogen sulphide carried into the reaction vessel by the circulating gas current, optimum amounts of hydrogen sulphide are maintained in the reaction vessel. Finally hydrogen sulphide may be obtained from the methane gases for example by extraction by solvents and converted in the usual way into sulphur and the sulphur so obtained added to the oil to be hydrogenated in such amounts that the content of sulphur, together with the hydrogen sulphide introduced into the process by the hydrogenation gas yields the desired concentration of hydrogen sulphide. It may be advantageous in some circumstances to subject the liquid product of the condensation to a partial reduction in pressure, the intermediate pressure to which it is reduced being so chosen that a methane fraction is obtained with a definite content of hydrogen sulphide exactly as desired.

The figure of the drawing is a diagrammatic arrangement of an apparatus suitable for carrying out the process. It is to be understood that the illustrated apparatus is merely illustrative, and although it has been found efficient, the invention is not limited to this or any other specific form of apparatus.

The carbonaceous material which is to be subjected to my disclosed process of destructive hydrogenation enters the oil pump 9 which forces it through conduits 10 and 13 into a preheater 14. The necessary hydrogen is supplied by the hydrogen compressor 11 through conduit 12 which discharges into the same inlet conduit 13 which carries the carbonaceous material into the preheater. The circulating gas which is returned to the hydrogenation reaction is returned to the preheater by conduit 41 which also connects with inlet pipe 13 leading into the preheater.

The preheater 14 may be of any suitable type. I have shown an arrangement in which a coiled pipe contains the mixed raw materials for the reaction and heat is supplied to the pipe by means of flame jets of oil, gas or similar fuel. Of course, any other suitable arrangement might be adopted, and any other means of supplying the necessary heat might be used. Coal, wood, or coke might be burned on grates or the heat from some other industrial process might be utilized. The important requirement is that the temperature of the raw materials should be adjusted to that temperature at which the reaction will occur in the reaction vessel without the addition of any further heat.

The heated raw materials flow out of the preheater through pipe 15 which conducts the mixture to the insulated reaction vessel 16 wherein the destructive hydrogenation process occurs. This vessel is insulated by a layer of insulating material 17 which prevents loss of heat by conduction or radiation from the exterior surfaces of the reaction vessel. The catalyst employed in the process is in the solid form and fills up the whole of the interior of the vessel. After the reaction has been completed, the reaction products escape from the vessel 16 through the conduit 19.

From conduit 19 the reaction products flow into a cooler 20. Here the products are cooled to room temperature, while, at the same time, the operating pressure is maintained. It will have been understood that the hydrogenation in the reaction vessel has been carried out under pressure and that this pressure is maintained in the cooler 20 while the temperature of the reaction products is lowered.

The reaction product is discharged from the cooler 20 into a separator 21 where the liquid products of the reaction are separated from the gaseous products, the latter being discharged through the conduit 31. The liquid products leave the separator through the conduit 22 and pass into the condensation pot 23 where the pressure is released and the liquid products are allowed to stand at atmospheric pressure. From the condensation pot, the liquids are conveyed to the gas separation column 24 where the dissolved gases escape, through conduit 26. The dissolved gases consist principally of methane, rich in hydrogen sulphide, and the sulphuretted hydrogen-methane mixture or "methane fraction" is liberated from the liquid products by the reduction of the pressure to atmospheric pressure. The methane fraction is conducted through conduit 26 to the sulphur removal apparatus 27 when the hydrogen sulphide is removed. The purified methane fraction is discharged through conduit 28. The hydrogen sulphide which has been removed from the gas leaves the removal apparatus 27 and may be either drawn off through the valve 42 or pumped back into the circulation process by the pump 29. The liquid products are drawn off from the separation column 24 through a discharge valve 25.

The gaseous product separated in the separator 21 is allowed to flow into the tower 32 through the conduit 31. This tower 32 serves to remove either excess hydrogen sulphide present in the gaseous product or the entire quantity of hydrogen sulphide. Hydrogen sulphide removal may be carried to any desired degree by adopting any one of several well known processes or constructions for the tower 32. The hydrogen sulphide, or the fluid containing the hydrogen sulphide, is removed from the tower through the conduit 36. It may be discharged through the valve 37 or allowed to pass to the pump 38 for subsequent utilization.

The gases, purified to a greater or less extent from the sulphuretted hydrogen, flow out of the tower 32 through a conduit 33 into a pump 34 provided to maintain the gas in circulation. Through conduit 40 the gases are forced into a tower 35 where the necessary quantity of hydrogen sulphide is added to the gases. This quantity of hydrogen sulphide is that amount which will, when added to the sulphur in the initial starting material, maintain the H₂S content at the value which will produce the "Varga effect" in the reaction vessel 16. This effect is the improvement of the yield as a result of the co-action of hydrogen sulphide and the main metallic catalyst used to improve the catalytic effect of the catalyst. The gases with the hydrogen sulphide content adjusted to this value are returned to the preheater 14 through the conduit 41.

The necessary hydrogen sulphide is supplied to the tower 35 through the conduit 30. It may be supplied through conduit 39 by pump 38 to which it has been conveyed after extraction in tower 32, or, it may be supplied from the sulphuretted hydrogen extracted from the liquid products in sulphur removal apparatus 27. In the later case, the hydrogen sulphide is pumped into conduit 30 and from there to the tower 35 by the pump 29. Hydrogen sulphide may be supplied from either source, as desired, or it may be supplied in part from one source and in part from the other. There is always an ample quantity of the gas available to adjust the sulphur content of the gases in tower 35 to the value essential in the attainment of the improved results of my process.

While I have herein disclosed one form of apparatus suitable for carrying out my circulation process, it is to be emphasized that the invention is not limited to that or to any other specified form of apparatus. The invention resides in a circulation process for carrying out a destructive hydrogenation reaction and is independent of the particular form of apparatus. Minor changes, or changes of considerable importance, might be made in the apparatus without effecting the success of the process, and these changes would be fully comprehended within the scope of my invention.

As examples of my improved process, the following specific examples are tabulated.

Example 1

In connection with the hydrogenation of a brown coal tar oil with 2.3 per cent content of sulphur, preliminary experiments showed that at 200 atmospheres pressure of hydrogen and a temperature of 450–480°, molybdic acid on pieces of red bauxite being used as the catalyst, a total of 3.5 per cent of sulphur, calculated on the tar oil, must be present in order to obtain an optimum yield of the products of hydrogenation and in particular of a benzine boiling up to 180° C. The behaviour of the oil was thereupon studied in continuous experiments, first of all by adding the necessary further amount of 1.2 per cent of sulphur to the oil as such. With the use of 1800 litres of hydrogenating gas containing 90–92 per cent of hydrogen, upon cooling of the products of reaction under the reaction pressure which was 200 atmospheres, 1100 litres of a gas were obtained for each kilogram of oil, which gas after partial removal of the gaseous hydrocarbons consisted of 80–90 per cent of hydrogen and 16 milligrams of hydrogen sulphide per litre which is equivalent to 15 milligrams of sulphur. Thus from this source, $$\frac{15 \times 1100 \times 100}{1000 \times 1000} = 1.65$$

per cent of sulphur were available, while only 1.2 per cent was necessary for enriching the oil to the optimum amount of sulphur. Accordingly, a washing apparatus filled with milk of lime was inserted in the return pipe and small amounts of milk of lime were allowed to trickle through it so that only about one quarter of the hydrogen sulphide present in the gas was taken into combination with the lime. The remaining amount returned to the reaction vessel. In this way, it was possible, without the use of sulphur added from outside sources, to work under optimum conditions merely by utilizing the hydrogen sulphide from the gases. Since separation of the gases and the milk of lime wash took place under the pressure of the reaction, a simply constructed circulating pump was sufficient to act as a conveying apparatus for the purpose of returning the gases and the pump worked readily with a content on the average of 12 milligrams of hydrogen sulphide in the gases. The amounts of hydrogen consumed amounting to about 700 litres per kilogram of oil were replaced in the reaction cycle by the addition of fresh hydrogen.

Under these conditions, an oil was obtained boiling up to 300° C. which contained 67 per cent of benzines boiling up to 180° C. On working without returning the hydrogen sulphide from the gases, that is by adding only fresh hydrogen into the reaction, the insufficient content of sulphur in the starting material immediately caused the result to be affected unfavourably. An oil was obtained which contained only 50 per cent of hydrocarbons boiling up to 180° C. On the other hand, if the gas was led back into the process as it occurred with 16 milligrams of hydrogen sulphide, the hydrogen sulphide in the circulating gas was again highly enriched. Quantities of hydrogen sulphide were quickly produced which by acting on the lubricating oil, the joints and the control members of the circulating pump imperilled reliable operation of the same. At the same time, the yield of oil decreased; and the content of this oil in the lower boiling point hydrocarbons was reduced from 55 to 30 up to 35 per cent.

It is also possible to proceed in the following way:

The gas containing 16 milligrams of hydrogen sulphide per litre is washed with water at the reaction pressure. In that way, 85 per cent of the content of hydrogen sulphide is taken up by the water. Further, a milk of lime washer is interposed and reduces the hydrogen sulphide to an amount of a few tenths of a milligram. The gas thus purified can now be brought by a conveying device of any suitable construction to a pressure sufficient to cause the return into the reaction vessel. In particular, no parts attacked by hydrogen sulphide need be employed in this conveying apparatus. The necessary hydrogen sulphide is again conducted into the hydrogen after passing from the conveying apparatus into a trickle tower in which the wash water containing hydrogen sulphide is by means of the Montejus vessel supplied at the top in a uniform stream while the hydrogen flows in from below in counter-current. The driving off of the hydrogen sulphide is facilitated by heating devices. By regulating the temperature at the foot of the tower to about 60° C. it is easily possible to add the necessary amounts of hydrogen sulphide to 13 grams per litre in the gases returning to the reaction. An apparatus so operated completely avoids the difficulties which otherwise might arise in conveying a gas containing a good deal of hydrogen sulphide at high pressures and it is therefore particularly suited for continuous operation.

Example 2

In the hydrogenation of a hard coal tar creosote oil with 0.8 per cent content of sulphur, pressure, temperature and catalyst were as in Example 1. Optimum yields were obtained with the presence of a total amount of 2 per cent of sulphur, calculated on the amount of oil employed. The continuous experiments in which 12 gms. of sulphur per kilogram of oil were added, showed, that, in this case, upon the separation of the gas taken off and the liquid product by cooling under the pressure of the reaction, a gas was obtained with only 5.3 milligrams of hydrogen sulphide per litre and in fact in an amount of 1000 litres per kilogram of oil. Accordingly only 0.5 per cent of sulphur was available for return to the reaction, while to cover the difference between the naturally occurring content of sulphur in the starting material and the amount necessary for the optimum yield from the hydrogenation, 1.2 per cent war necessary. Consequently the so-called methane gases which were obtained upon reducing the pressure of the liquid condensate to atmospheric pressure were employed as the further source of sulphur. This gas yielded about 14 gms. of sulphur per kilogram of oil in the form of hydrogen sulphide. The sulphur was extracted from the gas by washing with ammonia solution. About 50 per cent of the washing liquid was pumped into a so-called reaction mixer into which the necessary amount of sulphuric acid for decomposition was conducted at the same time. The liquids were mixed by the mixer and at the same time were finely dispersed together with the necessary fresh hydrogen in amounts of 800 litres per kilogram of oil, compressed to the reaction pressure and allowed to pass through, so that the combined hydrogen sulphide was added to this hydrogen. The gases coming off with 5 gms. of hydrogen sulphide per kilogram of oil and the fresh gas with 7–8 gms. of hydrogen sulphide per kilogram of oil were together easily able to cover the optimum requirement of sulphur for the reaction in continuous operation. In these circumstances, 1 litre of the product of hydrogenation is obtained per litre of tar oil. This is freed from small amounts of dissolved hydrogen sulphide by a single washing with soda solution and upon distillation yields 60 per cent of benzine boiling up to 180° C. which does not need any further refining. If fresh hydrogen alone is led into the reaction or the treatment is carried out with the return of only the entirely insufficient amount of sulphur contained in the hydrogen led off, a yield of only 95 per cent by volume is obtained with a content of benzine of 55 per cent.

I claim:—

1. A process for the treatment of a carbonaceous material which consists in subjecting the material to the action of hydrogen at a high temperature and pressure in the presence of hydrogen sulphide and of a catalyst containing material selected from the group which consists of molybdenum and tungsten, separating the reaction products into a gaseous and a liquid portion by cooling while substantially maintaining the pressure of the reaction, substantially removing from said reaction products corrosive sulphur compounds including hydrogen sulphide, pumping said gaseous portion back to the reaction and adding a portion of said recovered hydrogen sulphide to said gaseous portion after the latter has passed the pumping apparatus and in such an amount that the activity of said catalyst is increased.

2. A process for the treatment of a carbonaceous material which consists in subjecting the material to the action of hydrogen at a high temperature and pressure in the presence of hydrogen sulphide and of a catalyst containing material selected from the group which consists of molybdenum and tungsten, separating the reaction products into a gaseous and a liquid portion by cooling while substantially maintaining the pressure of the reaction, washing said reaction products until corrosive sulphur compounds including hydrogen sulphide are substantially removed therefrom, pumping said gaseous portion back to the reaction and bringing said gaseous portion again into contact with the washing liquid after the gaseous portion has passed the pumping apparatus in order to introduce a portion of the recovered hydrogen sulphide into said gaseous portion in such an amount that the activity of said catalyst is increased.

3. A process for the treatment of a carbonaceous material which consists in subjecting the material to the action of hydrogen at a high temperature and a high pressure in the presence of hydrogen sulphide and of a catalyst containing material selected from the group which consists of molybdenum and tungsten, separating the reaction products into a gaseous portion and a liquid condensate by cooling while substantially maintaining the pressure of the reaction recovering hydrogen sulphide from said reaction products, reconducting the gaseous portion mainly consisting of hydrogen back into the reaction and adding a portion of said recovered hydrogen sulphide to said gaseous portion in order to adjust the content of hydrogen sulphide to such an amount that the activity of said catalyst is increased.

4. A process for the treatment of a carbonaceous material, which consists in subjecting the material to the action of hydrogen at a high temperature and pressure in the presence of hydrogen sulphide and of a catalyst containing material selected from the group which consists of molybdenum and tungsten, separating the reaction products into a gaseous portion and a liquid condensate by cooling while substantially maintaining the pressure of the reaction, reducing the pressure of said liquid condensate to yield the so-called methane fraction, reconducting the gaseous portion mainly consisting of hydrogen back into the reaction, abstracting hydrogen sulphide from said reaction products and adding said abstracted hydrogen sulphide to said gaseous portion in such an amount that the activity of said catalyst is increased.

5. A process for the treatment of a carbonaceous material which consists in subjecting the material to the action of hydrogen at a high temperature and pressure in the presence of hydrogen sulphide and of a catalyst containing material selected from the group which consists of molybdenum and tungsten, separating the vapours evolved into a gaseous portion and a liquid condensate by cooling while substantially maintaining the pressure of the reaction, reducing the pressure of said liquid condensate to substantially atmospheric pressure to yield the so-called methane fraction, washing said methane fraction with an alkaline liquid, treating the resultant solution with acid to liberate the sulphur as a sulphur containing material and adding said sulphur containing material to said gaseous portion in such an amount that the activity of said catalyst is increased to the maximum value.

LAJOS von SZESZICH.